3,514,246
METHOD OF DYEING SHAPED POLYCARBONATE RESINS

Joseph Bianco, Lock Haven, Pa., and Victor T. Humphreys, Hinsdale, Ill., assignors to American Aniline Products, Inc., a corporation of Delaware
No Drawing. Continuation-in-part of application Ser. No. 535,669, Mar. 21, 1966. This application July 11, 1969, Ser. No. 841,113
Int. Cl. D06p 3/54
U.S. Cl. 8—4                                            6 Claims

ABSTRACT OF THE DISCLOSURE

Polycarbonate resin is dyed by immersing the polymer in an emulsified dye liquor, which comprises a water-insoluble, oil-soluble dyestuff, an oil-soluble surface active agent dissolved in an aliphatic hydrocarbon solvent, and sufficient water to provide a dyestuff concentration of up to one percent by weight.

RELATED APPLICATION

This application is a continuation-in-part of our copending application Ser. No. 535,669, filed Mar. 21, 1966 now abandoned.

BACKGROUND OF INVENTION

In recent years there has been growing commercial interest in the polycarbonate resins, which are polyesters based on carbonic acid instead of the more common organic acids, such as phthalic or maleic. Polycarbonates are made by reacting a compound of the formula

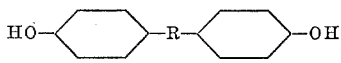

wherein R is an alkyl or cycloalkyl group, which may contain up to 12 carbon atoms and in addition hetero atoms such as oxygen or sulfur, with phosgene or a carbonic acid ester. By far the most important polycarbonates are those based on Bisphenol A, 2,2 - di(p - hydroxyphenyl)propane.

Dyes and pigments are conventionally incorporated in polycarbonate resins during their manufacture by the raw material supplier rather than during molding by the user. Two general problems have been encountered in attempting to color the resin: (1) the high melt viscosity of the resin make it difficult to disperse the color uniformly and (2) the high temperatures used in molding the resin permit the use of only those colorants stable at high temperatures, i.e., up to 625° F. In the conventional coloring of polycarbonate resin the color is added prior to the final extrusion-chopping operation. The coloring of pellets by the user is not recommended because of the problem of getting good dispersion and the possibility of contamination. Ordinary dry-blending techniques do not work satisfactorily with polycarbonates, even with the use of special pellets and lubricants. Heretofore there has been no commercially successful method of dyeing molded polycarbonates.

SUMMARY OF INVENTION

We have found a novel disperse dyeing technique which, surprisingly, readily permits the penetration of molded polycarbonate with no roughening or other adverse surface effects on the dyed resin. Using our method the color penetrates and disperses uniformly to considerable depth and is impossible to remove by scouring or with the use of solvents. Depending upon the color used and its concentration, any desired depth of shade can be obtained and, by mixing one or more colors, any desired shade can easily be obtained.

In accordance with the invention, polycarbonate resin is dyed by immersing the polymer in an emulsified dye liquor at a temperature between room temperature and the boiling point of the liquor. The dye liquor comprises (1) 0.01–1 percent by weight of a water-insoluble, oil-soluble dyestuff, (2) 0.1–3 percent by weight of a carrier consisting essentially of an oil-soluble surface active agent, characterized by substantially complete solubility of 0.5 gram surface active agent in 10 cc. of solvent naphtha, dissolved in aliphatic hydrocarbon solvent, the weight ratio of surface active agent to hydrocarbon solvent being 1:20–5:1, and (3) sufficient water to provide the above-indicated concentration of dyestuff.

DETAILED DESCRIPTION

Our novel process is particularly effective in coloring polycarbonate resins because there is no known method for effectively coloring such resins subsequent to molding. The process, however, can also be used with polycarbonate resins in chemical or physical admixture with other solvent-resistant synthetic resins such as polymethyl methacrylate, polypropylene, or polyethylene. The polycarbonate resin can be dyed in any form, although obviously the greatest commercial potential of our process is in the coloration of molded items.

The dyestuffs that are applied according to the invention are the water-insoluble, oil-soluble dyestuffs that are soluble in paraffinic and aromatic solvents. Particularly good results are obtained with the water-insoluble, oil-soluble dyestuffs of the azo or the anthraquinone series known as disperse dyes. Disperse dyes are defined as organic colors which are applied from near-colloidal aqueous dispersions in which the dyes literally dissolve to produce the desired coloration. The term "disperse dyes" has been adopted in American and British usage and is recognized by the new nomenclature system employed by the Colour Index, Second Edition, 1956. Specific useful dyestuffs include, but are not limited to, those appearing in Table I hereunder. Table I gives the chemical name and number of the dyestuff according to the Colour Index, Second Edition, 1956, as well as the hue obtained when the polycarbonate is dyed according to the present invention.

TABLE I

| Colorant | C.I. No. | C.I. Name | Hue of Dyed Polycarbonate |
|---|---|---|---|
| 4-phenylazo-N-dimethylaniline | 11020 | Solvent Yellow 2 | Greenish Yellow. |
| 3-(m-nitrophenylazo)-4-hydroxy-1-methyl carbostyril. | 12970 | Disperse Yellow 3 | Do. |
| 4-o-tolylazo-o-toluidine | 11160 | Solvent Yellow 3 | Reddish Yellow. |
| 1-(o-tolylazo)-2-naphthol | 12100 | Solvent Orange 2 | Reddish Orange. |
| 1-methylaminoanthraquinone | 60505 | Disperse Red 9 | Bluish Red. |
| 1-anilinoanthraquinone | 60510 | Disperse Red 22 | Do. |
| 4'-o-(tolylazo)-1-(2',5'-xylylazo)-2-naphthol. | 26120 | Solvent Red 26 | Do. |
| 1,4-diaminoanthraquinone | 61100 | Disperse Violet 1 | Reddish Blue. |
| 1,4-diamino-2-methoxy-anthraquinone. | 62015 | Disperse Red 11 | Bluish Red. |
| 4-p-toluidino-N-methyl-1-(N)-9-anthrapyridone. | 68210 | Solvent Red 52 | Do. |
| 1-(m-xylylazo)-2-naphthol | 12140 | Solvent Orange 7 | Reddish Orange. |
| 1,5+1,8-di(p-toluidino)-anthraquinone. | 61705 | Solvent Violet 14 | Reddish Blue. |
| 1,3-di-(p-toluidino)-anthraquinone | 61565 | Solvent Green 3 | Bluish Green. |
| 1,3-di-(ethanolamino)-5,8-dihydroxyanthraquinone. | 62500 | Disperse Blue 7 | Greenish Blue. |
| 1-methylamino-4-hydroxyethyl-aminoanthraquinone. | 61503 | Disperse Blue 3 | Do. |
| 4'-nitro-2',6'-chloro-4-phenylazo-N-methyl-N-hydroxyethyl-aniline. | 11100 | Disperse Orange 5 | Reddish Orange. |
| 3'-nitro-4'-anilino-N-benzene sulfonyl aniline. | 10338 | Disperse Yellow 42 | Greenish Yellow. |
| 4'-amino-4-phenylazo-1-naphthylamine. | 11365 | Disperse Black 1 | Bluish Black. |
| 1-amino-2-methoxy-4-hydroxy-anthraquinone. | 60755 | Disperse Red 4 | Bluish Pink. |

As we have noted, the dye liquor of the invention comprises 0.01–1 percent by weight of the water-insoluble, oil-soluble dyestuff in dispersed form (20–50% 100% pure color), 0.1–3 percent by weight of carrier, i.e., the oil-soluble surface active agent dissolved in aliphatic hydrocarbon solvent and the remainder water.

The particular dyestuff to be used can be added directly to the aqueous bath or first dissolved in the carrier in an amount corresponding to 0.01–1 percent by weight of the total dye liquor and then added to the aqueous bath. If less than about 0.01 percent dyestuff is used, the resulting dyeing is too light in shade; if greater than about 1 percent is used there is an undesirable loss of unused dye remaining in the dye liquor. Amounts of dye between 0.01 and 0.1% give pastel shades; deep shades are obtained using 1% by weight dyestuff.

The choice of carrier is of considerable importance. We have found no other carrier system which is effective both in dissolving the dyestuff and in penetrating the polycarbonate resin. The carrier consists essentially of an oil-soluble surface active agent, preferably an anionic or non-anionic surface active agent, dissolved in an aliphatic hydrocarbon solvent.

The oil-soluble surface active agent is selected from that class of materials extensively defined by Schwartz, Perry and Berch in their book Surface Active Agents and Detergents, vol. II, Interscience Publishers, Inc., New York (1958), especially at pages 244–247 and pages 597–605. Such useful surface active agents include the dialkyl sulfosuccinates, the mahogany sulfonates, long chain (16–18 carbon atoms) alkyl aromatic sulfonates, dialkyl naphthalene sulfonic acids, esters of higher fatty acids, higher amine salts of naphthalene sulfonic acids, lanolin, lanolin fatty acids, naphthenic acids and their salts, glycol ethers, acyclic alcohols and keto alcohols, fatty alkylol amides and the sorbitan and polyethenoxy sorbitan non-ionics.

The utility of a particular oil-soluble surface active agent for purposes of the invention is easily determined by testing its solubility in solvent naphtha. Useful oil-soluble surface active agents are characterized by substantially complete solubility of 0.5 g. surface active agent in 10 cc. of solvent naphtha. By "substantially complete solubility" we mean that the resulting solution will be, at room temperature, completely clear or only very slightly cloudy with no crystalline material remaining at the bottom of the solution. Thus, surface active agents such as sodium dodecylbenzene sulfonate and 9,10-octadecenyl-1 can easily be considered as not effective since they show a crystalline precipitate when subjected to the test specified above.

Only oil-soluble surface active agents are capable of emulsifying the aliphatic hydrocarbon solvent used as part of the carrier system. To avoid surface attack on the polycarbonate resin the solvent used for the surface active agent must consist essentially of an aliphatic hydrocarbon solvent. Particularly useful solvents in this class are solvent naphtha and Stoddard Solvent.

Naphtha solvent, or solvent naphtha as it is sometimes known, is a mixture of low boiling hydrocarbons having a boiling point range of 90–165° C. (195–330° F.) obtained in the distillation of coal tar, petroleum, or shale oil. Naphtha consists primarily of paraffinic hydrocarbons but, depending upon the source, may contain appreciable portions of benzene or its homologues. Stoddard Solvent is a petroleum distillate having a minimum flash point of 100° F., 50 percent being distillable at 350° F., 90 percent at 375° F. with an end point of 410° F. The solvent system may consist of, or contain, other essentially aliphatic hydrocarbons such as cyclohexane and perchloroethylene.

A preferred carrier system consists essentially of a sulfonated dicarboxylic acid ester of the formula:

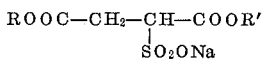

wherein R and R' are alkyl radicals having from four to twelve carbon atoms, dissolved in naphtha. Compounds of the above formula are made by sulfonating the unsaturated ester with bisulfite solution. Particularly useful compounds include diamyl sodium sulfosuccinate, dibutyl sodium sulfosuccinate, di(2-ethylhexyl)sodium sulfosuccinate, and di-t-octyl sodium sulfosuccinate, and di-dodecyl sodium sulfosuccinate. Best results are obtained using the di-t-octyl sodium sulfosuccinate.

The ratio of oil soluble surface active agent to aliphatic hydrocarbon solvent is important and ranges between 1:20–5:1. If less than 1 part surface active agent for 20 parts hydrocarbon solvent is used there is insufficient surface active agent to emulsify the dyestuff. If greater than 5 parts ester per part solvent is used the surface active agent entraps the dye and prevents penetration of the polycarbonate. Best results are obtained using 1–1.5 parts surface active agent for each 1–10 parts solvent.

The amount of carrier used ranges between 0.1 and 3 percent by weight based upon the total weight of the dye liquor. If less than 0.1 percent is used, there is insufficient carrier to disperse the color. No advantage is obtained in using amounts greater than 3 percent by weight, although there are no harmful effects from adding more carrier to the bath. The preferred amount of carrier is between 0.50 and 1.5 percent by weight of dye liquor.

The dyeing operation is accomplished by immersing the polycarbonate in the dye liquor prepared as described hereabove and dyeing at a temperature between about 60° C. and the boiling point of the liquor. The length of time for dyeing depends upon the time required for reaching the desired depth of shade or exhausting the color from the liquor, which may take from 5–60 minutes. As noted hereabove, the dye bath contains from 0.1 to 1.0 percent by weight dyestuff; this amount of dye generally corresponds to 0.5–2 percent by weight of disperse color (20–50% by weight pure dyestuff) based on the weight of material to be dyed.

Conveniently, dyeing is accomplished by heating the dye liquor up to about 60° C., preferably 75° C., immersing the polycarbonate and continuing heating at a temperature between 60° C. and the boiling point of the liquor until the desired strength of dye on the material is reached and the shade is matched. The polycarbonate is removed from the liquor, rinsed and soaped with any suitable soap or detergent. The resin is then rinsed again and dried. The resulting dyeings are excellent with respect to the depth of shade and are fast to light, fast to soap, and fast to solvents.

The method of the invention has a number of practical advantages. The dye liquor is a stable emulsion which can be used over a long period of time after its preparation. The liquor itself contains no chemicals which are harmful to the user, and the problem of the prior art workers relating to uniform dispersion of the dye in the polycarbonate has been eliminated. A wide range of commercially available colors can be applied successfully by the method of the invention.

Our invention is further illustrated by the following examples.

EXAMPLE I

A 0.75 g. quantity of C. I. Dispersed Red 17, 4'-nitro-4-phenylazo-5-methyl-N-dihydroxyethyl-aniline, was diluted with 500 ml. of water to form a dye liquor ultimately containing approximately 0.15 percent by weight dyestuff. A 5 g. quantity of a 50–50 percent by weight mixture of di-t-octyl sodium sulfosuccinate and naphtha solvent having a boiling range of 90–165° C. was then added. The dye liquor was heated to 80° C. and a 100 g. molded polycarbonate block (5¼" x 1¾" x ⅜") was immersed therein for five minutes while maintaining the bath at 80–100° C. The dyed block was then rinsed, soaped hot, rinsed and dried. The dyed polycarbonate was an orange red shade having excellent fastness to light, soaping and solvents.

EXAMPLE II

The procedure of Example I was repeated with the exception that sufficient dye was added to provide a dye liquor containing 0.3 percent by weight dyestuff. The dyed polycarbonate had a red shade of almost twice the depth as that of Example I.

EXAMPLE III

The procedure of Example I was repeated using a dye liquor containing 0.15 percent by weight of C. I. Dispersed Yellow 3,6-(p-acetyl-amino)-phenylazo-p-cresol. The resulting dyed polycarbonate had a bright yellow shade of excellent fastness to light, soaping and solvents.

EXAMPLE IV

The procedure of Example III was repeated with the exception that sufficient dye was added to provide a dye liquor containing 0.3 percent by weight dyestuff. The resulting dyed polycarbonate had a bright yellow shade almost twice the depth as that of Example III.

EXAMPLE V

The procedure of Example III was repeated using a dye liquor containing 0.15 percent by weight C. I. Dispersed Blue 1, 1,4,5,8-tetraminoanthraquinone. The resulting dyed polycarbonate had a blue shade of excellent fastness to light, soaping and solvents.

EXAMPLE VI

The procedure of Example V was repeated with the exception that sufficient dye was added to provide a dye liquor containing 0.3 percent by weight dyestuff. The resulting dyed polycarbonate had a deep blue shade almost twice the depth as that of Example V.

EXAMPLE VII

By repeating the procedure of Example V using a dye bath containing 0.05 percent by weight dyestuff, a blue pastel shade of excellent fastness properties is obtained.

EXAMPLE VIII

Polycarbonate was dyed by the procedure of Example I using 0.15 percent by weight the dye of Example III and 0.15 percent by weight of the dye of Example V. A bright green dyeing was obtained having excellent fastness to light, soaping and solvent.

EXAMPLE IX

The procedure of Example I was repeated using as a carrier 1 part sorbitan monolaurate dissolved in 10 parts solvent naphtha. The dyed polycarbonate was a red orange shade having excellent fastness to light, soaping, and solvents.

EXAMPLE X

The procedure of Example I was repeated using as a carrier 1 part polyoxyethylene sorbitan monolaurate dissolved in 10 parts solvent naphtha. The dye polycarbonate was a red orange shade having excellent fastness to light, soaping, and solvents.

EXAMPLE XI

The procedure of Example I was repeated using as a carrier 1 part octylphenoxydiethyloxyethanol dissolved in 10 parts solvent naphtha. The dyed polycarbonate was a red orange shade having excellent fastness to light, soaping, and solvents.

EXAMPLE XII

The procedure of Example I was repeated using as a carrier 1 part di-tertiary-octyl sodium sulfosuccinate dissolved in 10 parts Stoddard Solvent. The dyed polycarbonate was a red orange shade having excellent fastness to light, soaping, and solvents.

What is claimed is:

1. A method of coloring a shaped resin consisting essentially of polycarbonate comprising immersing said polycarbonate in a dye liquor at a temperature between 60° C. and the boiling point of said liquor, said liquor comprising (1) 0.01–1 percent by weight of a water-insoluble, oil-soluble dyestuff; (2) 0.1–3 percent by weight of a carrier consisting essentially of (a) an oil-soluble surface active agent, said surface active agent having substantially complete solubility of 0.5 g. surface active agent in 10 cc. of solvent naphtha, dissolved in (b) an aliphatic hydrocarbon solvent, the weight ratio of surface active agent to said solvent being 1:20–5:1, and (3) sufficient water to provide the above indicated concentration of dyestuff.

2. Method according to claim 1 wherein the ratio of surface active agent to hydrocarbon solvent is 1:10–1.5:1.

3. Method according to claim 1 wherein the carrier is present in an amount of 0.5 and 1 percent by weight.

4. Method according to claim 1 in which said dyestuff is present in an amount of 0.1–1 percent by weight.

5. A method of coloring a shaped resin consisting essentially of polycarbonate comprising immersing said polycarbonate in a dye liquor at a temperature between 60° C. and the boiling point of said liquor, said liquor comprising (1) 0.01–1 percent by weight of a water-insoluble, oil-soluble dyestuff; (2) 0.1–3 percent by weight of a carrier consisting essentially of a compound of the formula:

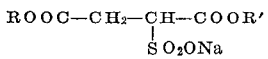

wherein R and R′ are alkyl radicals having from four to twelve carbon atoms, dissolved in naphtha solvent, the weight ratio of said compound to said naphtha being 1:20–5:1 and (3) sufficient water to provide the above-indicated concentration of dyestuff.

6. Method according to claim 5 wherein the carrier compound is di-t-octyl sodium sulfosuccinate.

References Cited
UNITED STATES PATENTS

| | | | |
|---|---|---|---|
| 2,028,091 | 1/1936 | Jaeger | 8—90 |
| 3,318,655 | 5/1967 | Naka et al. | 8—29 |

GEORGE F. LESMES, Primary Examiner

T. J. HERBERT, Jr., Assistant Examiner

U.S. Cl. X.R.

8—90; 260—37